E. Enete.
Rotary Cultivator.
No. 94,481. Patented Sept. 7, 1869.
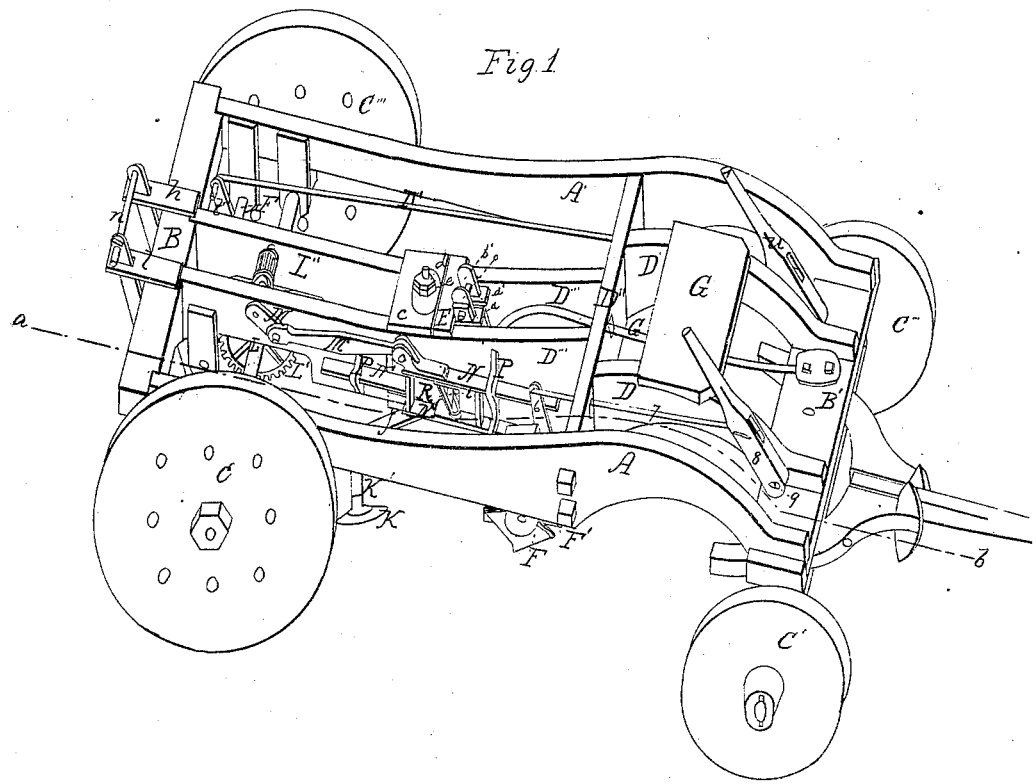
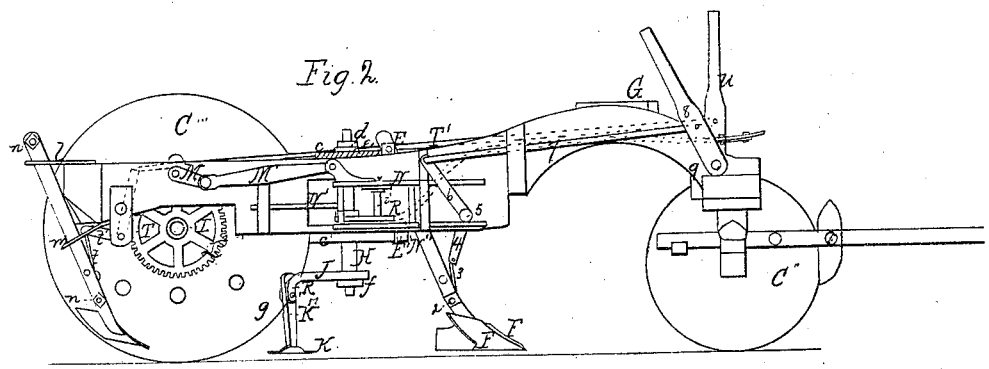
Witnesses
Rufus R. Rhodes
H. N. Jenkins
Inventor
E. Enete

United States Patent Office.

EMILE ENETE, OF CATAHOULA PARISH, LOUISIANA.

*Letters Patent No. 94,481, dated September 7, 1869.*

IMPROVEMENT IN COTTON-CULTIVATORS.

The Schedule referred to in these Letters Patent and making part of the same

*To all whom it may concern:*

Be it known that I, EMILE ENETE, of Catahoula parish, State of Louisiana, have invented a certain new and useful Improvement in Cotton-Cultivators; and I do hereby declare the following to be a full, clear, and exact description of the same, reference being had to the annexed drawing, making a part of this specification.

The object of my invention is to bar off, chop out, and throw back the earth to the cotton-plant, at one and the same time, and by a single machine, and thus to economize the cultivation of cotton, by providing a means for diminishing the number of laborers and horses or mules required for any given number of acres, or any given field.

In view of the great difficulty, indeed, I may say the utter impossibility of procuring a sufficiency of labor in the cotton-regions of the United States, my invention is of almost incalculable value and importance, as will be obvious to an, when I state, that by actual experiment, I have demonstrated that with it, one man, and two mules, I can do the work, which, under present methods of cultivation, requires fourteen men and four mules.

My invention consists of a combination of a pair of front plows, for barring off each cotton-row, a vibrating knife behind these plows, to chop out the cotton at regular intervals, and two covering-plows, following after the knife, to throw back the earth to the cotton, which said parts are all secured or mounted on the some machine, and so arranged as to be adjustable, and susceptible of being elevated above the ground, so as not to interfere with its movements from place to place when the machine is not in operation.

But my invention will be better understood by referring to the drawing, on which, at—

Figure 1, it is presented by a perspective view, and at

Figure 2, by a longitudinal sectional view, on line $a\ b$ of fig. 1.

Within a rectangular frame, A A' B B', that is mounted on four wheels, C C' C'' C''', by means of proper axles, to which it is secured by any usual or proper means, I secure an interior frame, consisting of the parts D D' D'' D''', to and on which my two pairs of plows, and the intermediate chopping-out knife or cutter, are attached and supported. The manner in which I do this, as well as the operation of my invention, can be best explained by reference to the drawing, on which the same letters denote the same parts at both the figures.

On cross-bars E E', that are securely fastened to the pieces D''' D'''', I mount the two barring-off plows F F', between said pieces D''' D'''', by means of four projecting brackets, two of which are shown at $a\ a'$, in which the shanks $b\ b'$ of said plows are fitted in such manner as to allow them to move easily up and down. The brackets not shown are secured to or in cross-bar E'.

The cross-rods 1 2, hold the plows F F' in parallel relations to each other, at any desired distance apart, the rod 1, in connection with a series of holes in the upper ends of the shanks $b\ b'$, constituting a means, also, for regulating the penetration of the plows, or depth of the furrow, the regulation being effected by changing the rod from two higher to two lower holes, or *vice versa*, accordingly as the penetration of the plows below the surface of the ground is to be increased or diminished.

The plows F F' have their mould-boards in reverse position to each other, both looking outwardly, so that they throw the earth from the row of cotton which, in the operation of the machine, they straddle, the one running on one, and the other on the opposite side of said row.

By means of an eye-bolt, or any equivalent means, a link, 3, at its lower extremity, is connected to the rod 2, whilst at its other or upper end, it is pivoted to the arm 4 of the rock-shaft 5. This shaft is supported in proper journals, that are secured at or near the lower edge of the pieces D''' D'''', substantially as shown.

To another arm, 6, projecting from the shaft 5 at about the angle shown, with respect to the arm 4, at its outer end is pivoted a rod, 7, that leads and is pivoted to the head-lever 8, that articulates, at its lower end, on a pin, 9, just in front and on the right hand of the driver's seat G. This mechanism constitutes my means for elevating the plows F F' above the ground, whenever the machine is to be turned around, after having reached the end of a row, to go upon another, or to be transported from one place to another; for it will be seen that the driver has only to push the lever 8 forward, to lift the plows above the ground, and to pull it back, to put them again in position for work.

A ratchet and pawl, or a spring-catch, or any other usual contrivance, may be employed to maintain the lever 8 in any given position. Not claiming such contrivance, whatever may be its nature, I have not considered it necessary to show it on the drawing.

By means of strong supporting transverse pieces $e\ e'$, I mount a vertical rock-shaft, H, between the pieces D''' D'''', so as to be in precise line with a point midway between the plows F F', that is to say, in the centre of the machine, with respect to its sides.

For some distance down from the top of this rock-shaft, it is provided with a screw-thread, in order that a tap, $d$, may be fitted to raise or lower it, and hold it in any given position with relation to the ground.

To prevent injury to the screw-thread on shaft H, a loose sleeve is put around it, which being provided with a flanch, e, at its upper extremity, affords a support for the tap d, as shown at both figures.

The shaft H should extend higher than as shown in the drawing, and in order to secure the same motion in the sleeve which the said shaft has, a tap similar to d may be put under said sleeve, so as to clamp it tightly, if experience shall show it to be necessary.

To the lower end of shaft H, which extends considerably below the pin c', as shown, an arm, J, which near its outer extremity curves downwardly, and is bifurcated, as shown, is secured by means of a tap, f; and to this arm the cutter or knife K is attached, by means of the vertical slotted bar K', which enters between the parts g h of said arm, and is secured therein by a bolt, 10. The slot in the bar K' affords an additional means to the tap d, for regulating the height of the cutter K above the ground. The cutter K subserves the function of chopping out the cotton-plants at regular intervals, and vibratory motion is given to it, with the view to the accomplishment of this end, in the following manner:

On the rear axle, L, of the machine, a cog-wheel, L', is secured, which gears into a pinion, L'', on the axis of which, the same being supported in journals in the pieces D''' D'''', as shown, is placed a crank, M, connecting with a pitman, M', that is pivoted to a frame, N N' N'', by means of a projecting jaw, O.

The frame N N' N'' is supported by guide-brackets P P', that are fastened on the outside of the piece D'''', as shown, and is connected with the rock-shaft H by means of the slotted arm R, projecting therefrom, and a pin or bar, i.

In the operation of the machine, the rotation of the crank M imparts a reciprocating motion to the frame N N' N'', and through the slotted arm R, vibrates the cutter K at regular intervals, whatever may be the speed or rate of progress of the machine over the field. The length of the arc of vibration of the cutter may be increased or diminished, by increasing or diminishing the length of the crank M; and the intervals between the points at which the cutter passes over the row and chops out the plants, may be made greater or less by changing the length of the arm J.

A lever, S, loosely connected with the shaft H, with its fulcrum in the transverse piece D'', and extending under the driver's seat to a point over the cross-frame B', affords the means by which the driver, with his foot, may, at his pleasure, elevate the shaft H and the cutter K, whenever an elevation is desirable or necessary.

At the rear extremity of the machine, the covering-plows Y Y' are secured, as shown, by means of projecting arms or brackets k l m m', the latter not shown, substantially in the same manner as the barring-off plows F F' are secured in their place, except that the former have their turning-surfaces or mould-boards looking toward each other, so as to throw the earth to, and not from the plants. These plows are maintained in parallel positions, and at any desired distance apart, by means of two rods n n', precisely as in the case of the barring-off plows F F'. So also are they elevated above the ground by exactly similar means, to wit, by a link, t, that is secured to the rod n', and connected with an arm, t', of a rock-shaft, T, which is provided with another arm, t'', that, in its turn, connects with a pitman, T', that leads to a lever, u, on the left hand of the driver, which operates in all respects precisely like lever S, and is held in any given position by the same means employed for that purpose, in connection with that lever.

A tongue, W, secured in a frame, W', or in any proper manner, affords a means for attaching the animals to the machine. To facilitate the turning around of the machine, one wheel on each axle should be fitted on loosely, and in such a manner as that they can be adjusted outwardly and inwardly on the axles, to adapt the machine to different widths of rows.

Having thus described my invention,

What I claim, and desire to secure by Letters Patent, is—

The combination of the barring-off plows F F', and the cutter or knife K, with the covering-plows Y Y', when these parts are constructed, arranged, and operate substantially as described, for the purpose set forth.

E. ENETE.

Witnesses:
RUFUS R. RHODES,
H. N. JENKINS.